C. A. TOWER.
FRICTION DRAFT RIGGING.
APPLICATION FILED APR. 19, 1911.
1,154,967.
Patented Sept. 28, 1915.
3 SHEETS—SHEET 2.
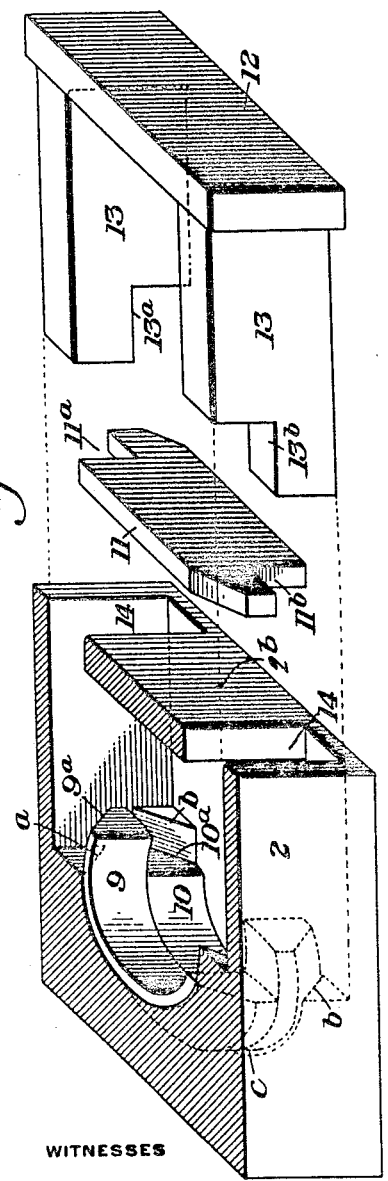
INVENTOR
C. A. Tower

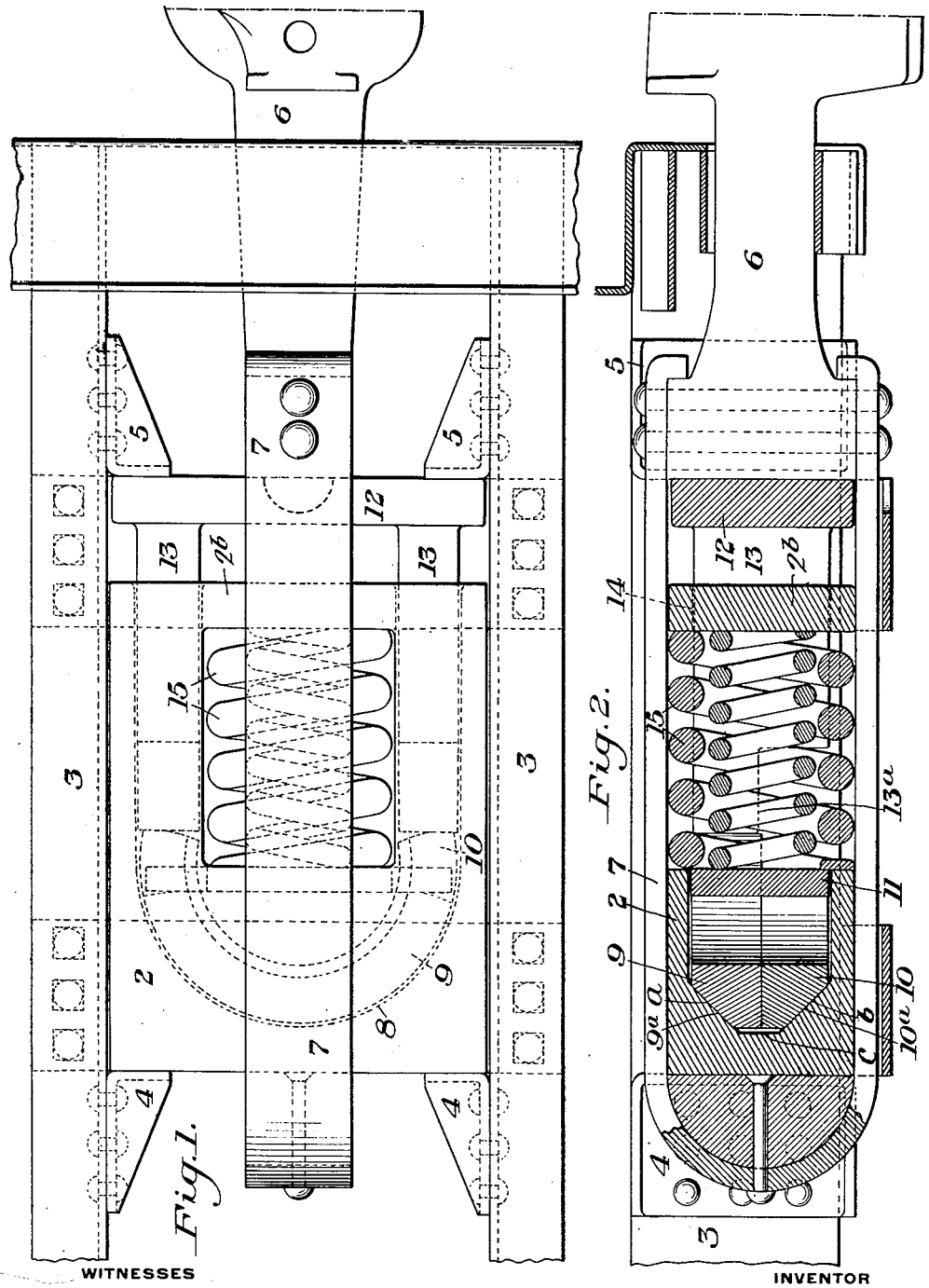

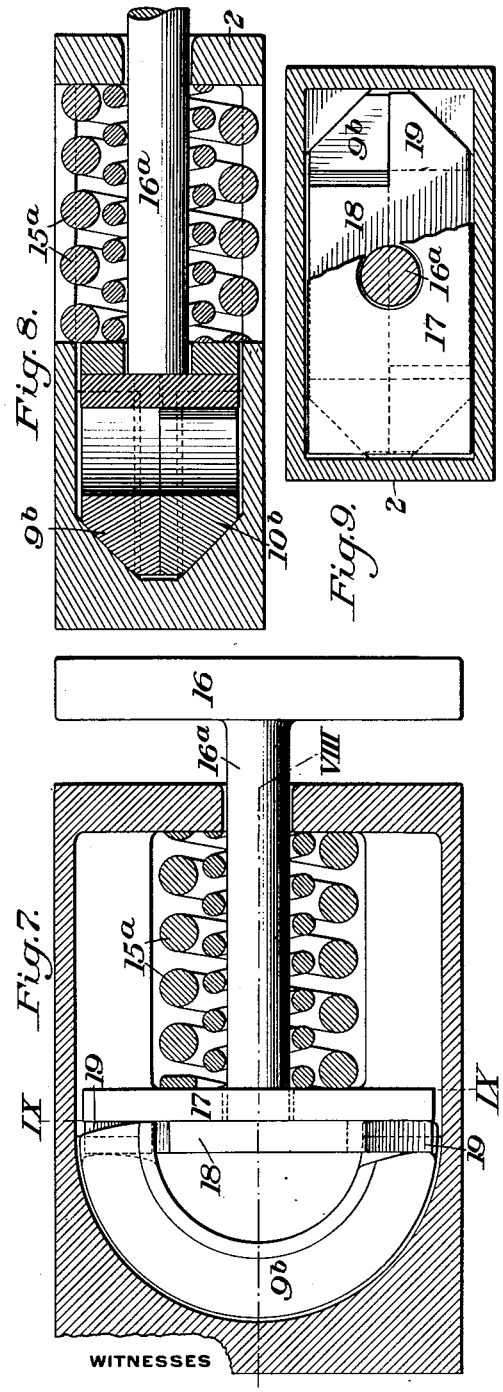

UNITED STATES PATENT OFFICE.

CLINTON A. TOWER, OF CLEVELAND, OHIO, ASSIGNOR TO THE NATIONAL MALLEABLE CASTINGS COMPANY, OF CLEVELAND, OHIO, A CORPORATION OF OHIO.

FRICTION DRAFT-RIGGING.

1,154,967. Specification of Letters Patent. Patented Sept. 28, 1915.

Application filed April 19, 1911. Serial No. 622,059.

*To all whom it may concern:*

Be it known that I, CLINTON A. TOWER, of Cleveland, Cuyahoga county, Ohio, have invented a new and useful Improvement in Friction Draft-Riggings, of which the following is a full, clear, and exact description, reference being had to the accompanying drawings, forming part of this specification, in which—

Figure 1 is a plan view showing a complete draft rigging embodying my invention; Fig. 2 is a longitudinal vertical section of the same; Fig. 3 is a sectional view showing some of the parts in separated positions; Fig. 4 is a horizontal section through the casing, with some of the parts in place, the plane of the section being on the line IV—IV of Fig. 5; Fig. 5 is a section on the line V—V of Fig. 4; Fig. 6 is a section on the line VI—VI of Fig. 5; Fig. 7 is a sectional plan view showing a modification of the invention; Figs. 8 and 9 are sections on the line VIII—VIII and IX—IX of Fig. 7.

My invention has relation to friction draft riggings, and is designed to provide a draft rigging of this character, which is of simple and efficient construction.

The invention is susceptible of a number of modifications, some of which are shown in the drawings, and which will now be described, it being premised, however, that the invention is not limited to these particular modifications, and that various changes may be made in the details of construction and arrangement of the parts without departing from the spirit and scope of my invention as defined in the appended claims.

Referring first to the form of my invention which is shown in Figs. 1 to 6, inclusive, the numeral 2 designates the rear follower of the draft rigging, which preferably forms a housing for the draft rigging elements about to be described. This housing or casing is adapted to fit between the draft sills 3 of a car, and between the stops 4 and 5 secured to the inner sides of said sills, and acts as a rear follower which moves forwardly under pulling strains as hereinafter described. 6 designates a coupler shank, and 7 the usual yoke or strap which embraces the casing 2 and is secured to the coupler shank. The inner wall of the interior of the chamber of the casing is rounded to the arc of a circle, as indicated at 8; and in the form of the invention shown in these figures this rounded rear wall is composed of three faces $a$, $b$ and $c$, the faces $a$ and $b$ converging toward the edges of the central straight face $c$, as clearly shown in Figs. 2 and 5. 9 and 10 designate two friction elements, which are of segmental form, with their outer or convex friction surfaces rounded to arcs of the same circle as the rounded rear end of the casing and having the beveled faces $9^a$ and $10^a$ respectively, which have a frictional engagement with the converging walls $a$, $b$.

11 designates an inner follower, and 12 a front follower, the rear end of the coupler shank bearing against the latter. This front follower is provided with the rearwardly projecting arms 13, which are adapted to enter openings 14 in the front end of the casing 2. One of the arms 13 is cut away at its lower forward end, as shown at $13^a$, and the other arm is cut away at the upper portion of its forward end as shown at $13^b$. One end of the inner follower 11 is cut away from the upper side, as shown at $11^a$ to receive the projecting end $13^a$ of one of the follower arms 13; and the other end of the follower 11 is cut away at its lower portion, as shown at $11^b$ to receive the projecting end $13^b$ of the other follower arm 13. By reason of this construction of the arms of the follower 12 and of the ends of the follower 11, one arm $13^a$ will bear at its inner end against the one end of the upper friction element 9, and the other arm $13^b$ of the follower 12 will bear at its inner end against the opposite end of the lower friction member 10.

The numeral 15 designates springs of any suitable character which are interposed between the inner follower 11 and the abutment $2^b$ at the forward end of the casing 2.

The operation is as follows:—Under a buffing strain (in which case the rear or closed end of the casing member abuts against the rear stops or lugs 4 on the draft sills and is held thereby from rearward movement), the arms of the front follower 12 are caused by the coupler to travel farther into the casing, and in so doing exert a pressure upon one of the forward projecting ends of each of the friction members, causing them to rotate and slide in opposite directions upon the curved rear wall of the casing. As they rotate, their other ends, by reason of their engagement with the inner follower 11, act to force said follower forwardly and thereby to compress the springs 15. As the two friction members thus slide in opposite directions, friction is created not only upon the converging faces $a$, $b$ of the casing 2, but also upon the flat, contacting surfaces of the friction members 9 and 10, which are forced into engagement with each other by reason of such inclined converging surfaces.

Under pulling strains, the operation is substantially the same, the front follower being held stationary against the front stops 5, while the rear follower or casing is drawn forwardly by the action of the strap or yoke 7.

While I prefer to employ the converging inclined surfaces $a$, $b$, as shown, I do not wish to limit myself thereto, since it is obvious that these surfaces may be of various forms.

In Fig. 3 I have shown the parts separated for greater clearness, and have shown the rear follower 11 removed from the casing and out of its true assembled position.

In the modification shown in Figs. 7, 8 and 9, the front follower 16, instead of having two arms or prongs, is formed with a single central plunger $16^a$, which extends through a hole in the inner follower 17 and engages a second inner follower 18. The follower 18 has projections 19, which engage opposite ends of the two friction elements $9^b$ and $10^b$ corresponding respectively to the friction elements 9 and 10 first described. The other end of each of these friction elements contacts with the follower 17. The operation is substantially the same as in the form first described.

It will be noted that owing to the shape of the contact ends of the friction segment or segments, a differential action is obtained in operation which is very effective in its character. Thus, referring for instance to the construction shown in Fig. 1, it will be seen that at the beginning of a buffing or pulling movement when the arms of the follower 12 are about to enter the casing, the points of contact between the projecting arms 13 and the ends of the friction plates will be as far removed from the longitudinal center line of the casing as possible. As the follower continues its inward movement, however, these points of contact travel toward the longitudinal center line, until at the completion of the movement the contact is at points near the inner edges of the friction plates. Furthermore, the initial points of contact between the other ends of the friction plates and the inner follower 11, are substantially at the inner edges thereof, and travel away from the longitudinal center line toward the outer edges as the movement progresses. It will be obvious that the closer the points of actuating contact between the arms 13 and the forward ends of the friction plates are to the longitudinal center line, the harder it will be to actuate or rotate said plates. Furthermore, the farther away from the longitudinal center line the points of contact between the other ends of the friction plate and the follower 11 are, the more powerfully will the spring 15 resist the rotative motion of the friction elements. This differential action, therefore, is an accumulative one, that is to say, at the same time that there is a differential action between the arms 13 and the forward ends of the friction members, there is a similar differential action, assisting the first, and occurring between the other ends of the friction members and the follower which bears against the spring. By reason of the sum of these differential actions, the result is that whereas the follower 12 may commence to operate the friction elements from a comparatively favorable position, it completes its movement at a much less favorable position, due to the shifting points of contact above described, and at a time when a high capacity is desirable; and this action reinforces the friction capacity and the resistance of the springs.

While I have shown the part which has the friction surfaces coöperating with the sliding or rotative friction elements, as being in the form of a casing, it will be understood that this is not essential to my invention. As a matter of fact, this member acts as a rear follower, and may take various forms.

It will be seen that in all forms of my invention I provide a friction draft rigging having one or more friction elements having at one end an engagement with a follower, and the opposite end having an engagement through a follower element with a compression and release spring; and that these friction elements are so arranged that they will have a strong frictional contact with the coöperating friction surfaces of another follower, which preferably forms a container for the other parts. They may also be caused to have a greater or less frictional action upon each other, when more than a single element is employed.

What I claim is:—

1. In a friction draft rigging, a friction member having friction surfaces of arcuate form, a plurality of superposed segmental friction members having a rotative sliding frictional contact with said surfaces, and spring and follower devices adapted to engage opposite ends of the friction elements, the friction surfaces on the said member being arranged to force the friction elements into frictional contact with each other; substantially as described.

2. In a friction draft rigging, a friction member having oppositely inclined friction faces of arc shape in horizontal section, a plurality of friction shoes movable relatively to the friction member each of which has an inclined friction face engaging one of the inclined friction faces of the friction member, springs and followers for moving the friction shoes in opposite directions and for forcing them against the inclined faces of the friction member, the last named inclined faces being adapted to wedge the friction shoes against each other to cause a sliding frictional engagement therebetween as they move in opposite directions.

In testimony whereof, I have hereunto set my hand.

CLINTON A. TOWER.

Witnesses:
CHESTER K. BROOKS,
HARRY E. ORR.